United States Patent
Im et al.

(10) Patent No.: US 9,580,552 B2
(45) Date of Patent: Feb. 28, 2017

(54) POLYAMIDE ESTER RESIN, METHOD FOR PREPARING THE SAME, AND MOLDED ARTICLE INCLUDING THE SAME

(71) Applicant: Samsung SDI Co., Ltd., Yongin-si (KR)

(72) Inventors: Sang Kyun Im, Uiwang-si (KR); Shin Hyo Bae, Uiwang-si (KR); Su Yeong Son, Uiwang-si (KR); Ki Yon Lee, Uiwang-si (KR); So Young Kwon, Uiwang-si (KR); Joon Sung Kim, Uiwang-si (KR); Jin Kyu Kim, Uiwang-si (KR); Tae Joon Park, Uiwang-si (KR); Young Sub Jin, Uiwang-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 0 days.

(21) Appl. No.: 14/685,927

(22) Filed: Apr. 14, 2015

(65) Prior Publication Data

US 2016/0083509 A1    Mar. 24, 2016

(30) Foreign Application Priority Data

Sep. 23, 2014 (KR) .................. 10-2014-0127057
Dec. 16, 2014 (KR) .................. 10-2014-0181808

(51) Int. Cl.
*C08G 63/02* (2006.01)
*C08G 69/44* (2006.01)

(52) U.S. Cl.
CPC .................. *C08G 69/44* (2013.01)

(58) Field of Classification Search
CPC .............................. C08G 63/16; C08G 63/52
USPC .................................................. 528/302, 288
See application file for complete search history.

(56) References Cited

U.S. PATENT DOCUMENTS

| 9,371,421 B2 * | 6/2016 | Kwon ............... C08G 69/44 |
| 2010/0203275 A1 * | 8/2010 | Hoffmann ......... C08G 69/08 |
| | | 428/36.9 |

FOREIGN PATENT DOCUMENTS

| JP | 01-167329 A | 7/1989 |
| JP | 04-306229 A | 10/1992 |
| JP | 05-156010 A | 6/1993 |

OTHER PUBLICATIONS

Search Report in counterpart European Application No. 15163206.4 dated Jun. 18, 2015, pp. 1-5.

* cited by examiner

*Primary Examiner* — Terressa Boykin
(74) *Attorney, Agent, or Firm* — Additon, Higgins & Pendleton, P.A.

(57) ABSTRACT

A polyamide ester resin includes: a repeat unit derived from a dicarboxylic acid; a repeat unit derived from a diamine; and a repeat unit represented by the following Formula 1, wherein the polyamide ester resin has a melting temperature (Tm) of about 280° C. or more. The polyamide ester resin can exhibit excellent properties in terms of moisture absorption resistance, heat resistance, discoloration resistance, fluidity and the like by using a cyclic ester.

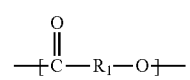

[Formula 1]

wherein $R_1$ is a $C_3$ to $C_{12}$ linear, branched or cyclic alkylene group.

11 Claims, No Drawings

POLYAMIDE ESTER RESIN, METHOD FOR PREPARING THE SAME, AND MOLDED ARTICLE INCLUDING THE SAME

CROSS-REFERENCE TO RELATED APPLICATION

This application claims priority under 35 USC Section 119 to and the benefit of Korean Patent Application 10-2014-0127057, filed Sep. 23, 2014, and Korean Patent Application 10-2014-0181808, filed Dec. 16, 2014, the entire disclosure of each of which is incorporated herein by reference.

FIELD

The present invention relates to a polyamide ester resin, a method for preparing the same, and a molded article including the same.

BACKGROUND

Highly heat resistant nylon (polyamide) can be obtained by polycondensation of an aromatic dicarboxylic acid or an aromatic diamine. The highly heat resistant nylon can have a semi-aromatic structure and a semi-crystalline structure, and can be used in various fields requiring high heat resistance due to considerably higher heat resistance as compared with general nylon products.

In many electronic applications, the highly heat resistant nylon must be soldered by a lead-free solder at a surface temperature of about 260° C. without formation of blisters and must have no distortion even after absorption of water. Thus, the highly heat resistant nylon should exhibit excellent properties in terms of moisture absorption resistance, heat resistance, moldability and the like.

Examples of highly heat resistant nylon generally used in electronic and other applications include PA4T, PA6T, PA9T, PA10T, PA11T, PA12T, and the like. Highly heat resistant nylon using a $C_9$ or longer chain diamine may be used directly as a homopolymer or may be used in the form of a copolymer using a small amount of a comonomer (dicarboxylic acid or diamine). Generally, PA4T and PA6T homopolymer cannot be processed due to the extremely high melting point thereof; thus, a large amount (dozens %) of the comonomer is introduced to improve melt processability.

In PA6T, examples of the comonomer include adipic acid, isophthalic acid and the like, which are generally used in the art, and may also include short-chain and long-chain aliphatic diamines, cyclic aliphatic diamines, branched aliphatic diamines, short-chain and long-chain aliphatic dicarboxylic acids, cyclic aliphatic dicarboxylic acids, branched aliphatic dicarboxylic acids, and the like. In addition, a cyclic aliphatic dicarboxylic acid may be used instead of an aromatic dicarboxylic acid to produce products with excellent optical and thermal properties, and copolymerization of a monomer capable of increasing glass transition temperature (Tg) may be performed to prevent deterioration in properties of nylon products at high temperature. However, such copolymerization cannot prevent discoloration of nylon upon exposure to air at high temperature.

Highly heat resistant polyester-based products can also be used for products requiring discoloration resistance instead of highly heat resistant nylon. Highly heat resistant polyester-based products, however, generally exhibit lower heat resistance than highly heat resistant nylon and can have drawbacks, such as poor moisture absorption resistance, moldability and the like under high humidity conditions, despite excellent discoloration resistance thereof.

Therefore, there is a need for polyamide ester resins (amide-ester hybrid resin) which can exhibit excellent heat resistance, discoloration resistance and the like, as compared with existing highly heat resistant nylon products, and can improve moisture absorption resistance, moldability, and the like, which are drawbacks of polyester products.

SUMMARY OF THE INVENTION

The present invention can provide a highly heat resistant crystalline polyamide ester resin which can exhibit excellent properties in terms of moisture absorption resistance, heat resistance, discoloration resistance and a property balance therebetween, a method for preparing the polyamide ester resin, and a molded article formed from the polyamide ester resin.

The polyamide ester resin includes: a repeat unit derived from a dicarboxylic acid; a repeat unit derived from a diamine; and a repeat unit represented by the following Formula 1, wherein the polyamide ester resin has a melting temperature (Tm) of about 280° C. or more.

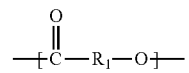

[Formula 1]

wherein $R_1$ is a $C_3$ to $C_{12}$ linear, branched or cyclic alkylene group.

In exemplary embodiments, the repeat unit represented by Formula 1 may be derived from a cyclic ester compound represented by Formula 2 and/or a hydroxycarboxylic acid compound represented by Formula 3:

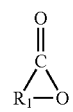

[Formula 2]

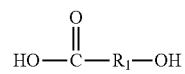

[Formula 3]

wherein $R_1$ is defined as in Formula 1.

In exemplary embodiments, the dicarboxylic acid may include about 50 mol % to about 100 mol % of a $C_8$ to $C_{20}$ aromatic dicarboxylic acid and optionally about 50 mol % or less of a $C_6$ to $C_{20}$ aliphatic dicarboxylic acid.

In exemplary embodiments, the diamine may include at least one $C_4$ to $C_{20}$ aliphatic diamine.

In exemplary embodiments, the repeat unit represented by Formula 1 may be present in an amount of about 1 part by mole to about 30 parts by mole based on about 100 parts by mole of the repeat unit derived from the dicarboxylic acid and the repeat unit derived from the diamine, and a molar ratio of the repeat unit derived from the dicarboxylic acid to the repeat unit derived from the diamine (dicarboxylic acid/diamine) may range from about 0.95 to about 1.15.

In exemplary embodiments, the polyamide ester resin may have: a crystallization temperature (Tc) of about 250° C. to about 290° C.; a glass transition temperature (Tg) of about 80° C. to about 120° C.; an intrinsic viscosity of about 0.5 dL/g to about 2.0 dL/g; and a water absorption rate of about 1.5% or less as measured on a specimen having a size of about 100 mm×about 100 mm×about 3 mm after treatment of the specimen at about 50° C. and about 90% relative humidity (RH) for about 48 hours.

In exemplary embodiments, the polyamide ester resin may have a color change (ΔE) of about 4 to about 7 as represented by Equation 1:

$$\text{Color change } (\Delta E) = \sqrt{(\Delta L^*)^2 + (\Delta a^*)^2 + (\Delta b^*)^2} \quad \text{[Equation 1]}$$

wherein ΔL* is a difference of L* before and after a scorch test, Δa* is a difference of a* before and after the scorch test, and Δb* is a difference of b* before and after the scorch test.

The present invention also relates to a method for preparing the polyamide ester resin as set forth above. The method for preparing the polyamide ester resin includes polymerizing a monomer mixture including a dicarboxylic acid, a diamine, and a cyclic ester compound represented by Formula 2 and/or a hydroxycarboxylic acid compound represented by Formula 3, wherein the polyamide ester resin has a melting temperature (Tm) of about 280° C. or more.

In exemplary embodiments, the method may include: preparing a prepolymer by polymerization of the monomer mixture; and performing solid-state polymerization of the prepolymer.

In exemplary embodiments, the solid-state polymerization may be performed by heating the prepolymer to a temperature of about 150° C. to about 280° C.

The present invention further relates to a molded article formed from the polyamide ester resin.

DETAILED DESCRIPTION

Exemplary embodiments now will be described more fully hereinafter in the following detailed description, in which some, but not all embodiments of the invention are described. Indeed, this invention may be embodied in many different forms and should not be construed as limited to the embodiments set forth herein; rather, these embodiments are provided so that this disclosure will satisfy applicable legal requirements.

According to exemplary embodiments, a polyamide ester resin includes: (A) a repeat unit derived from a dicarboxylic acid; (B) a repeat unit derived from a diamine; and (C) a repeat unit represented by the following Formula 1, wherein the polyamide ester resin has a melting temperature (Tm) of about 280° C. or more:

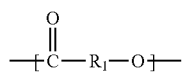

[Formula 1]

wherein $R_1$ is a $C_3$ to $C_{12}$ linear, branched or cyclic alkylene group.

As used herein, terms such as "dicarboxylic acid" and derivatives thereof include dicarboxylic acids, alkyl esters thereof ($C_1$ to $C_4$ low-order alkyl esters such as monomethyl, monoethyl, dimethyl, diethyl, and/or dibutyl ester, and the like), acid anhydrides thereof and the like, and mixtures thereof. The dicarboxylic acid and/or derivative thereof form a repeat unit (dicarboxylic acid moiety) through reaction with a diamine and a cyclic ester compound and/or a hydroxycarboxylic acid compound.

In addition, as used herein, terms such as "dicarboxylic acid moiety," "repeat unit derived from a diamine (diamine moiety)" and "repeat unit represented by Formula 1 (cyclic ester moiety and/or hydroxycarboxylic acid moiety)" refer to residues which remain after removal of hydrogen atoms of dicarboxylic acids and diamines (removed from amine groups), hydroxyl or alkoxy groups (removed from carboxylic acid groups), and residues which remain after removal of hydrogen atoms of ring-opened cyclic ester moieties or hydroxycarboxylic acid compounds (removed from hydroxyl groups) and hydroxyl or alkoxy groups (removed from carboxylic acid groups) when the dicarboxylic acids, the diamines and the cyclic ester compounds and/or hydroxycarboxylic acid compounds are polymerized, respectively.

(A) Repeat Unit Derived from a Dicarboxylic Acid

According to exemplary embodiments, the repeat unit derived from the dicarboxylic acid is a residue which remains after removal of a hydroxyl or alkoxy group from a carboxylic acid group of the dicarboxylic acid. For example, the repeat unit may be represented by the following Formula 4:

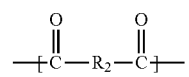

[Formula 4]

wherein $R_2$ is a remaining portion excluding the carboxylic acid group of the dicarboxylic acid. For example, $R_2$ may be a $C_4$ to $C_{30}$ hydrocarbon group or a $C_4$ to $C_{30}$ hydrocarbon group containing one or more heteroatoms such as but not limited to oxygen atoms and/or sulfur atoms and the like, for example a $C_4$ to $C_{18}$ linear, branched or cyclic alkylene group, a $C_6$ to $C_{18}$ arylene group, a $C_4$ to $C_{18}$ linear, branched or cyclic alkylene group containing heteroatom(s), and/or a $C_6$ to $C_{18}$ arylene group containing heteroatom(s).

In exemplary embodiments, the dicarboxylic acid may be any dicarboxylic acid used for typical polyamide resins without limitation. For example, the dicarboxylic acid may include an aromatic dicarboxylic acid, for example, at least one $C_8$ to $C_{20}$ aromatic dicarboxylic acid. Examples of the aromatic dicarboxylic acid may include without limitation terephthalic acid, isophthalic acid, 2,6-naphthalenedicarboxylic acid, 2,7-naphthalenedicarboxylic acid, 1,4-naphthalenedicarboxylic acid, 1,3-phenylenedioxydiacetic acid, diphenic acid, 4,4'-oxybis(benzoic acid), diphenylmethane-4,4'-dicarboxylic acid, diphenylsulfone-4,4'-dicarboxylic acid, 4,4'-diphenyldicarboxylic acid, and the like, and mixtures thereof. For example, the aromatic dicarboxylic acid may include terephthalic acid, isophthalic acid, and mixtures thereof.

The aromatic dicarboxylic acid may be present in an amount of about 50 mol % to about 100 mol %, for example, about 55 mol % to about 90 mol %, and as another example about 55 mol % to about 80 mol %, based on the total mol % (100 mol %) of the dicarboxylic acid(s) used to make the repeat unit derived from dicarboxylic acid. In some embodiments, the aromatic dicarboxylic acid may be present in an amount of about 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, or 100 mol %. Further, according to some embodiments of the present invention, the amount of the aromatic dicarboxylic acid can be in a range from about any of the foregoing amounts to about any other of the foregoing amounts.

Within this range, the polyamide ester resin can exhibit excellent heat resistance, crystallinity and the like.

In addition, the dicarboxylic acid may further include an aliphatic dicarboxylic acid to further improve processability of the polyamide ester resin. The aliphatic dicarboxylic acid may be a $C_6$ to $C_{20}$ aliphatic dicarboxylic acid, for example, adipic acid, without being limited thereto. The aliphatic dicarboxylic acid may be optionally present in an amount of about 50 mol % or less, for example, about 10 mol % to about 45 mol %, and as another example about 20 mol % to about 45 mol %, based on the total mol % (100 mol %) of the dicarboxylic acid(s) used to make the repeat unit derived from dicarboxylic acid. In some embodiments, the aliphatic dicarboxylic acid may be present in an amount of 0 mol % (the aliphatic dicarboxylic acid is not present), about 0 mol % (the aliphatic dicarboxylic acid is present), 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 mol %. Further, according to some embodiments of the present invention, the amount of the aliphatic dicarboxylic acid can be in a range from about any of the foregoing amounts to about any other of the foregoing amounts.

Within this range, the polyamide ester resin can exhibit further improved processability with minimal or no deterioration of other properties.

(B) Repeat Unit Derived from Diamine

According to exemplary embodiments of the invention, the repeat unit derived from the diamine is a residue which remains after removal of hydrogen atoms from an amine group of the diamine. For example, the repeat unit may be represented by the following Formula 5:

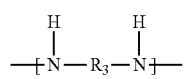

[Formula 5]

wherein $R_3$ is a remaining portion excluding the amine group of the diamine. For example, $R_3$ may be a $C_4$ to $C_{30}$ hydrocarbon group or a $C_4$ to $C_{30}$ hydrocarbon group containing one or more heteroatoms such as but not limited to oxygen atoms and/or sulfur atoms, and the like, for example a $C_4$ to $C_{20}$ linear, branched or cyclic alkylene group, a $C_6$ to $C_{30}$ arylene group, a $C_4$ to $C_{20}$ linear, branched or cyclic alkylene group containing heteroatom(s), and/or a $C_6$ to $C_{30}$ arylene group containing heteroatom(s).

In exemplary embodiments, the diamine may be any diamine used for typical polyamide resins without limitation. For example, the diamine may include an aliphatic diamine.

In exemplary embodiments, the aliphatic diamine may include at least one $C_4$ to $C_{20}$ aliphatic diamine. Examples of the aliphatic diamine may include without limitation 1,4-butanediamine, 1,6-hexanediamine (hexamethylenediamine, HMDA), 1,7-heptanediamine, 1,8-octanediamine, 1,10-decanediamine (DDA), 1,12-dodecanediamine (DDDA), 3-methyl-1,5-pentanediamine, 2,2,4-trimethyl-1,6-hexanediamine, 2,4,4-trimethyl-1,6-hexanediamine, 5-methyl-1,9-nonanediamine, 2,2-oxybis(ethylamine), bis(3-aminopropyl)ether, ethylene glycol bis(3-aminopropyl) ether (EGBA), 1,7-diamino-3,5-dioxoheptane, and the like, and mixtures thereof.

In exemplary embodiments, the aliphatic diamine may be a mixture of a $C_4$ to $C_{10}$ aliphatic diamine and a $C_{11}$ to $C_{20}$ aliphatic diamine, without being limited thereto. In this case, in the total aliphatic diamine, the $C_4$ to $C_{10}$ aliphatic diamine may be present in an amount of about 1 mol % to about 99 mol %, for example, about 50 mol % to about 95 mol %, and as another example about 85 mol % to about 95 mol %, and the $C_{11}$ to $C_{20}$ aliphatic diamine may be present in an amount of about 1 mol % to about 99 mol %, for example, about 5 mol % to about 50 mol %, and as another example about 5 mol % to about 15 mol %.

In some embodiments, the mixture of the $C_4$ to $C_{10}$ aliphatic diamine and the $C_{11}$ to $C_{20}$ aliphatic diamine may include the $C_4$ to $C_{10}$ aliphatic diamine in an amount of about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, or 99 mol %. Further, according to some embodiments of the present invention, the amount of the $C_4$ to $C_{10}$ aliphatic diamine can be in a range from about any of the foregoing amounts to about any other of the foregoing amounts.

In some embodiments, the mixture of the $C_4$ to $C_{10}$ aliphatic diamine and the $C_{11}$ to $C_{20}$ aliphatic diamine may include the $C_{11}$ to $C_{20}$ aliphatic diamine in an amount of about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, or 99 mol %. Further, according to some embodiments of the present invention, the amount of the $C_{11}$ to $C_{20}$ aliphatic diamine can be in a range from about any of the foregoing amounts to about any other of the foregoing amounts.

Within this range, the polyamide ester resin can exhibit improved properties in terms of heat resistance, high-temperature discoloration resistance, and the like.

The aliphatic diamine may be present in an amount of about 70 mol % to about 100 mol %, for example, about 80 mol % to about 99 mol %, based on the total mol % (100 mol %) of the diamine(s) used to make the repeat unit derived from diamine. In some embodiments, the aliphatic diamine may be present in an amount of about 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, or 100 mol %. Further, according to some embodiments of the present invention, the amount of the aliphatic diamine can be in a range from about any of the foregoing amounts to about any other of the foregoing amounts.

Within this range, the polyamide ester resin can exhibit excellent properties in terms of melt processability, dimensional stability, heat resistance such as glass transition temperature, and the like.

In addition, according to the present invention, the diamine may further include an aromatic diamine to improve heat resistance, crystallinity and the like of the polyamide ester resin.

The aromatic diamine may include at least one $C_6$ to $C_{30}$ aromatic diamine. Examples of the aromatic diamine may include without limitation phenylenediamine compounds such as m-phenylenediamine and p-phenylenediamine, xylenediamine compounds such as m-xylenediamine and p-xylenediamine, naphthalenediamine compounds, and the like, and mixtures thereof.

The aromatic diamine may be optionally present in an amount of about 30 mol % or less, based on the total mol % (100 mol %) of the diamine(s) used to make the repeat unit derived from diamine. In some embodiments, the aromatic diamine may be present in an amount of 0 mol % (the aromatic diamine is not present), about 0 mol % (the aromatic diamine is present), 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30 mol %. Further, according to some embodiments of the present invention, the amount of the aromatic diamine can be in a range from about any of the foregoing amounts to about any other of the foregoing amounts.

In the polyamide ester resin according to the embodiment of the invention, a molar ratio of the (A) repeat unit derived from the dicarboxylic acid to the (B) repeat unit derived from the diamine, that is, a molar ratio of the dicarboxylic acid to the diamine used in reaction ((A) dicarboxylic acid/(B) diamine) may range, for example, from about 0.95 to about 1.15, and as another example from about 1.0 to about 1.1. Within this range, the polyamide ester resin can prevent deterioration in properties due to unreacted monomers, and a polymer having a melt processable molecular weight can be obtained.

(C) Repeat Unit Represented by Formula 1

According to the present invention, the repeat unit represented by Formula 1 is a residue which remains after removal of hydrogen atoms from a hydroxyl group of a ring-opened cyclic ester compound moiety and/or hydroxycarboxylic acid compound and removal of a hydroxyl and/or alkoxy group from a carboxylic acid group.

In exemplary embodiments, the cyclic ester compound is ring-opening-polymerized in the polyamide ester resin, and can improve moisture absorption resistance, heat resistance and/or discoloration resistance of the polyamide ester resin. The cyclic ester may be any lactone-form compound without limitation. For example, the cyclic ester compound may be represented by the following Formula 2:

[Formula 2]

wherein $R_1$ may be a $C_3$ to $C_{12}$ linear, branched or cyclic alkylene group, for example, a $C_4$ to $C_{10}$ linear alkylene group.

Examples of the cyclic ester may include without limitation δ-valerolactone, ε-caprolactone, enantholactone, 4-methyl caprolactone, 2,2,4-trimethyl caprolactone, 3,3,5-trimethyl caprolactone, and the like, and mixtures thereof.

In exemplary embodiments, the hydroxycarboxylic acid compound is condensation-polymerized in the polyamide ester resin, and can improve moisture absorption resistance, heat resistance and/or discoloration resistance of the polyamide ester resin. The hydroxycarboxylic acid compound may be any typical hydroxycarboxylic acid compound without limitation. For example, the hydroxycarboxylic acid compound may be represented by the following Formula 3:

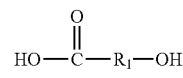

[Formula 3]

wherein $R_1$ may be a $C_3$ to $C_{12}$ linear, branched or cyclic alkylene group, for example, a $C_4$ to $C_{10}$ linear alkylene group.

Examples of the hydroxycarboxylic acid compound may include without limitation 5-hydroxypentanoic acid, 6-hydroxyhexanoic acid, and the like, and mixtures thereof.

When the polyamide ester resin is prepared through a general method of polymerizing highly heat resistant nylon ($H_2O$, high-pressure reaction) using diols as a monomer instead of the cyclic ester compound and/or hydroxycarboxylic acid compound, the diols forming an ester bond with the dicarboxylic acid can come out of the resin again by hydrolysis of the ester bond during reaction. In addition, since the diols can come out in conjunction with a solvent in a solvent removal process, it can be extremely difficult to adjust a reaction equivalent weight of the diols.

On the other hand, the cyclic ester compound according to the present invention forms carboxyl group (—COOH) and hydroxyl group (—OH) ends, or forms a hydroxyl group end and an amide bond with the diamine upon ring opening by water ($H_2O$) or the diamine. In addition, the carboxyl group end forms an amide bond by reaction with the diamine. As a result, one side of the cyclic ester compound and/or the hydroxycarboxylic acid compound forms an amide bond, and the other side thereof forms an ester bond of the hydroxyl group and the dicarboxylic acid. That is, since the cyclic ester compound and/or the hydroxycarboxylic acid compound are not volatilized in the form of a monomer upon solvent removal even though the ester bond is hydrolyzed by the amide bond after formation of the resin, and the hydroxyl group end and the carboxyl group end form an ester bond again upon high-pressure reaction (solid-state reaction), an ester bond can be effectively introduced into highly heat resistant nylon. Through introduction of the ester bond, the polyamide ester resin exhibiting excellent properties in terms of moisture absorption resistance, heat resistance, discoloration resistance and the like can be obtained.

In the polyamide ester resin according to the invention, the repeat unit represented by Formula 1 (cyclic ester compound and/or hydroxycarboxylic acid compound) may be present in an amount of about 1 part by mole to about 30 parts by mole, for example, about 5 parts by mole to about 20 parts by mole, based on about 100 parts by mole of the repeat unit derived from the dicarboxylic acid and the repeat unit derived from the diamine. In some embodiments, the repeat unit represented by Formula 1 may be present in an amount of about 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30 parts by mole. Further, according to some embodiments of the present invention, the amount of the repeat unit represented by Formula 1 can be in a range from about any of the foregoing amounts to about any other of the foregoing amounts.

Within this range, the polyamide ester resin can exhibit excellent properties in terms of moisture absorption resistance, heat resistance, discoloration resistance, and the like.

The polyamide ester resin may have an end group encapsulated with an end capping agent including at least one of an aliphatic carboxylic acid and/or an aromatic carboxylic acid. Examples of the end capping agent may include, without limitation, acetic acid, propionic acid, butyric acid, valeric acid, caproic acid, caprylic acid, lauric acid, tridecanoic acid, myristic acid, palmitic acid, stearic acid, pivalic acid, isobutyric acid, benzoic acid, toluic acid, α-naphthalenecarboxylic acid, β-naphthalenecarboxylic acid, methylnaphthalenecarboxylic acid, mixtures thereof, and the like, and mixtures thereof.

The end capping agent may be present in an amount of about 0.01 parts by mole to about 5 parts by mole, for example, about 0.1 parts by mole to about 3 parts by mole, based on about 100 parts by mole of the dicarboxylic acid and the diamine, without being limited thereto.

The polyamide ester resin may be prepared by a typical method of preparing a polyamide. For example, the polyamide ester resin may be prepared by polymerization of a monomer mixture including the dicarboxylic acid, the diamine, and the cyclic ester compound and/or hydroxycarboxylic acid compound.

Polymerization may be performed by a typical polymerization method, for example, melt polymerization. In addition, a polymerization temperature may range from about 80° C. to about 300° C., for example, from about 90° C. to about 280° C., and a polymerization pressure may range from about 10 kgf/cm² to about 40 kgf/cm², without being limited thereto.

In exemplary embodiments, the polyamide ester resin may be prepared by preparing a prepolymer through polymerization of the monomer mixture, followed by solid-state polymerization of the prepolymer. For example, the monomer mixture, a catalyst and water can be placed in a reactor, followed by stirring at about 80° C. to about 150° C. for about 0.5 hours to about 2 hours, and then maintained at about 200° C. to about 280° C. and a pressure of about 20 kgf/cm² to about 40 kgf/cm² for about 1 hour to about 4 hours. Next, with the pressure reduced to about 10 kgf/cm² to about 30 kgf/cm², (copolymerization) reaction can be performed for about 1 hour to about 3 hours, thereby obtaining a prepolymer. Next, the prepolymer can be subjected to solid-state polymerization (SSP) at a temperature between a glass transition temperature (Tg) and a melting temperature (Tm) in a vacuum for about 5 hours to about 30 hours, thereby obtaining the polyamide ester resin.

The prepolymer may have an intrinsic viscosity [η] of about 0.1 dL/g to about 1.0 dL/g, for example, about 0.1 dL/g to about 0.5 dL/g, as measured at about 25° C. using an Ubbelohde viscometer after the prepolymer is dissolved to a concentration of about 0.5 g/dL in a concentrated sulfuric acid solution (98%). Within this range, the polyamide ester resin can exhibit excellent melt processability.

In exemplary embodiments, solid-state polymerization may be performed by heating the prepolymer to a temperature of about 150° C. to about 280° C., for example, about 180° C. to about 250° C., in a vacuum or in the presence of an inert gas such as nitrogen, argon and the like. Within this range, the polyamide ester resin having a weight average molecular weight of about 5,000 g/mol to about 50,000 g/mol can be obtained.

The catalyst may be used in copolymerization. The catalyst may include a phosphorus catalyst, for example, phosphoric acid, phosphorous acid, hypophosphorous acid, salts and/or derivatives thereof, and the like, and mixtures thereof. For example, the catalyst may include phosphoric acid, phosphorous acid, hypophosphorous acid, sodium hypophosphate, and/or sodium hypophosphinate, and the like.

The catalyst may be present in an amount of about 3 parts by weight or less, for example, about 0.001 parts by weight to about 1 part by weight, and as another example about 0.01 parts by weight to about 0.5 parts by weight, based on about 100 parts by weight of the total monomer mixture, without being limited thereto.

In addition, the end capping agent may be present in an amount as set forth above in the method for preparing the polyamide ester resin, and viscosity of the prepared polyamide ester resin may be adjusted through adjustment of the amount of the end capping agent.

In exemplary embodiments, the polyamide ester resin may have a melting temperature (Tm) of about 280° C. or more, for example, about 280° C. to about 330° C. If the melting temperature is less than about 280° C., the polyamide ester resin can suffer from deterioration in heat resistance, discoloration resistance and the like, and can be unsuitable as a highly heat resistant resin.

The polyamide ester resin may have a crystallization temperature (Tc) of about 250° C. to about 290° C., for example, about 255° C. to about 280° C. Within this range, the polyamide ester resin exhibiting excellent crystallinity can be obtained.

The polyamide ester resin may have a glass transition temperature (Tg) of about 80° C. to about 120° C., for example, about 85° C. to about 110° C. Within this range, the polyamide ester resin can exhibit excellent properties in terms of heat resistance, thermal discoloration resistance, fluidity, and the like.

Discoloration resistance of the polyamide ester resin can be evaluated in the following method. First, a color (L*, a*, b*) of the prepared polyamide ester resin is measured in accordance with ASTM D1209, followed by a scorch test in which a specimen of the polyamide ester resin having a size of about 100 mm×about 100 mm×about 3 mm is prepared and left in a gear oven at about 170° C. for about 1 hour. Next, color is measured again in the same manner, followed by evaluating discoloration resistance of the polyamide ester resin through calculation of the color change (ΔE) as represented by Equation 1:

$$\text{Color change } (\Delta E) = \sqrt{(\Delta L^*)^2 + (\Delta a^*)^2 + (\Delta b^*)^2} \qquad \text{[Equation 1]}$$

wherein ΔL* is a difference of L* before and after the scorch test, Δa* is a difference of a* before and after the scorch test, and Δb* is a of b* between before and after the scorch test.

The polyamide ester resin may have a color change (ΔE) of about 4 to about 7, for example, about 4 to about 6. Within this range, the polyamide ester resin exhibiting excellent discoloration resistance can be obtained.

The polyamide ester resin may have a water absorption rate (moisture absorption rate) of about 1.5% or less, for example, about 0.1% to about 1.0%, and as another example about 0.5% to about 1.0%, as measured on a specimen having a size of about 100 mm×about 100 mm×about 3 mm after treatment of the specimen at about 50° C. and about 90% RH for about 48 hours. Within this range, the polyamide ester resin can exhibit excellent moisture absorption resistance and thus can be prevented from suffering from blisters and the like in a surface mounting (SMT) process when applied to electronics.

For example, first, a specimen having a size of about 100 mm×about 100 mm×about 3 mm can be prepared and subjected to vacuum drying at about 130° C. for about 4 hours, followed by measurement of a weight of the dried specimen ($W_0$). Next, the dried specimen can be treated in a thermohygrostat at about 50° C. and about 90% RH for about 48 hours, followed by measurement of a weight of the specimen ($W_1$), thereby calculating the water absorption rate using Equation 2:

$$\text{Water absorption rate (\%)} = |W_1 - W_0|/W_0 * 100 \qquad \text{[Equation 2]}$$

In addition, the polyamide ester resin may have an intrinsic viscosity [η] of about 0.1 dL/g to about 2.0 dL/g, for example, about 0.5 dL/g to about 1.5 dL/g, as measured at about 25° C. using an Ubbelohde viscometer after the polyamide ester resin is dissolved to a concentration of about 0.5 g/dL in a concentrated sulfuric acid solution (98%). Within this range, the polyamide ester resin can exhibit excellent moldability.

The polyamide ester resin may have a weight average molecular weight of about 5,000 g/mol to about 50,000 g/mol, as measured by gel permeation chromatography (GPC), without being limited thereto.

A molded article can be formed from the polyamide ester resin as set forth above. A molded article of the polyamide ester resin may be used as materials for electronics, without being limited thereto. The molded article can be easily formed by those skilled in the art.

Hereinafter, the present invention will be described in more detail with reference to the following examples. It should be understood that these examples are provided for illustration only and are not to be construed in any way as limiting the present invention.

EXAMPLES

Examples 1 to 4 and Comparative Examples 1 to 4

According to a composition as listed in Table 1, a monomer mixture, which includes terephthalic acid (TPA) and adipic acid (AA) as a dicarboxylic acid (diacid), hexamethylenediamine (HMDA) as a diamine, and ε-caprolactone as a cyclic ester compound, 1.49 parts by mole of benzoic acid as an end capping agent based on 100 parts by mole of the dicarboxylic acid and the diamine, 0.1 parts by weight of sodium hypophosphite as a catalyst and 74 parts by weight of water based on 100 parts by weight of the monomer mixture are placed in a 1 liter autoclave, which in turn is filled with nitrogen. The components are stirred at 100° C. for 60 minutes, heated to 250° C. for 2 hours, and subject to reaction for 3 hours under a load of 25 kgf/cm². Next, with the autoclave decompressed to 15 kgf/cm², reaction is performed for 1 hour. Next, the resulting material is subjected to flash to separate water and a polyamide pre-copolymer from each other. The separated pre-copolymer (intrinsic viscosity [η]=about 0.2 dL/g) is placed in a tumbler-shaped reactor, followed by solid-state polymerization up to 230° C. for 24 hours. Next, the reactor is slowly cooled to room temperature, thereby obtaining a polyamide ester resin.

absorption rate, gas generation amount, and discoloration resistance using the following methods. Results are shown in Table 2. Here, in order to form specimens for evaluation of intrinsic viscosity, fluidity, moisture absorption rate, gas generation amount and discoloration resistance, glass fibers may be used in an amount of 30 parts by weight based on 100 parts by weight of the resin.

Property Evaluation (1) Melting temperature, Crystallization temperature and Glass transition temperature (unit: ° C.): Melting temperature, crystallization temperature and glass transition temperature of each of the polyamide ester resins prepared in the Examples and Comparative Examples are measured using a differential scanning calorimeter (DSC). The DSC is a Q20 measuring apparatus (TA Co., Ltd.). In addition, crystallization temperature is measured from an exothermic peak obtained in the course of cooling 5 mg to 10 mg of a specimen at a rate of 10° C./min after the specimen is subjected to vacuum drying at 80° C. for 4 hours (3,000 ppm or less of moisture), heated from 30° C. to 400° C. at a rate of 10° C./min in a nitrogen atmosphere, and maintained at 400° C. for 1 minute. Further, after measurement of the crystallization temperature, the specimen is left at 30° C. for 1 minute and measured as to glass transition temperature and melting temperature from transition temperature and a maximum point of an endothermic peak obtained in the course of heating the specimen to 400° C. at a rate of 10° C./min (2nd scan), respectively.

(2) Intrinsic viscosity (unit: dL/g): The prepared polyamide ester resin is dissolved to a concentration of 0.5 g/dl in a concentrated sulfuric acid solution (98%), followed by measurement of intrinsic viscosity at 25° C. using an Ubbelohde viscometer.

(3) Melt index (MI, unit: g/10 min): Melt index is measured at 330° C. under a load of 2.16 kgf in accordance with ASTM D1238.

(4) Moisture absorption rate (water absorption rate, unit: %): A specimen having a size of 100 mm×100 mm×3 mm is prepared and subjected to vacuum drying at 120° C. for 4 hours. A weight of the dried specimen ($W_0$) is measured. Next, the dried specimen is treated in a thermohygrostat at 50° C. and 90% RH, followed by measurement of a weight of the specimen ($W_1$). The water absorption rate is calculated by Equation 2.

Water absorption rate (%)=|$W_1$−$W_0$|/$W_0$*100     [Equation 2]

TABLE 1

| | | Example | | | | Comparative Example | | | |
|---|---|---|---|---|---|---|---|---|---|
| Monomer | | 1 | 2 | 3 | 4 | 1 | 2 | 3 | 4 |
| Diacid | TPA (mol %) | 57.9 | 60.5 | 66.7 | 72.2 | 55 | 57.5 | 60 | 65 |
| | AA (mol %) | 42.1 | 39.5 | 33.3 | 27.8 | 45 | 42.5 | 40 | 35 |
| Diamine | HMDA (mol %) | 100 | 100 | 100 | 100 | 100 | 100 | 100 | 100 |
| Cyclic ester | ε-caprolactone | 5.3 | 5.3 | 5.3 | 11.1 | — | — | — | — |
| Molar ratio | [Diamine]/[Diacid] | | | | 1.015 | | | | |

*Unit for amount of cyclic ester compound: parts by mole based on 100 parts by 20 mole of dicarboxylic acid (diacid) and diamine Experimental Example Each of the polyamide ester resins prepared in the Examples and Comparative Examples is evaluated as to melting temperature, crystallization temperature, glass transition temperature, intrinsic viscosity, fluidity, moisture (5) Gas generation amount (unit: % by weight (wt %)): Gas generation amount is measured by measuring isothermal TGA using TGA Q500 (TA instruments Inc.). Specifically, 20 mg of the resin is placed on a sample pan, heated to 120° C. at a rate of 10° C./min, and then maintained for 30 minutes to dry water in the resin. Next, the resin is heated to 350° C. at a rate of 10° C./min and the amount of decomposition gas (based upon reduction in weight of the resin) is measured while the temperature is maintained for 30 minutes.

(6) Discoloration resistance: Discoloration resistance is evaluated based on a color change (ΔE) between before and after a scorch test. A color (L*, a*, b*) of the prepared polyamide ester resin is measured using a colorimeter (model: CM-2600d, KONICA MINOLTA Co., Ltd.) in accordance with ASTM D1209, followed by the scorch test in which a specimen of the polyamide ester resin having a size of 100 mm×100 mm×3 mm is prepared and left in a gear oven at 170° C. for 1 hour. Next, color is measured again in the same manner, followed by evaluating discoloration resistance of the polyamide ester resin through calculation of the color change (ΔE), as represented by Equation 1:

Color change $(\Delta E) = \sqrt{(\Delta L^*)^2 + (\Delta a^*)^2 + (\Delta b^*)^2}$ [Equation 1]

wherein ΔL* is a difference of L* before and after the scorch test, Δa* is a difference of a* before and after the scorch test, and Δb* is a difference of b* before and after the scorch test.

(7) Discoloration resistance: Discoloration resistance is evaluated through a yellow index change (ΔYI) before and after a scorch test. A yellow index (YI) of a specimen of the prepared polyamide ester resin having a size of 100 mm×100 mm×3 mm is measured using a colorimeter (model: CM-2600d, KONICA MINOLTA Co., Ltd.) in accordance with ASTM E313-73, followed by a scorch test in which the specimen is left in a gear oven at 170° C. for 1 hour. Next, a yellow index (YI) of the specimen is measured again in the same manner, followed by evaluating discoloration resistance of the polyamide ester resin through calculation of the yellow index change (ΔYI), as represented by Equation 3:

Yellow index change $(\Delta YI) = YI_0 - YI_1$ [Equation 3]

wherein $YI_0$ is a yellow index of the specimen before the scorch test and $YI_1$ is a yellow index of the specimen after the scorch test.

include the cyclic ester compound, exhibit heat resistance and crystallinity, the polyamide ester resins of the Comparative Examples exhibit significantly deteriorated properties in terms of fluidity, moisture absorption resistance, discoloration resistance and the like.

Many modifications and other embodiments of the invention will come to mind to one skilled in the art to which this invention pertains. Therefore, it is to be understood that the invention is not to be limited to the specific embodiments disclosed and that such modifications and other embodiments are intended to be included within the scope of the appended claims.

What is claimed is:

1. A polyamide ester resin comprising:
   a repeat unit derived from a dicarboxylic acid;
   a repeat unit derived from a diamine; and
   a repeat unit represented by the following Formula 1,
   wherein the polyamide ester resin has a melting temperature (Tm) of about 280° C. or more:

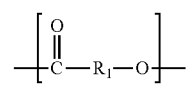

[Formula 1]

wherein $R_1$ is a $C_3$ to $C_{12}$ linear, branched or cyclic alkylene group.

2. The polyamide ester resin according to claim 1, wherein the repeat unit represented by Formula 1 is derived from a cyclic ester compound represented by the following Formula 2, a hydroxycarboxylic acid compound represented by the following Formula 3, or a mixture thereof:

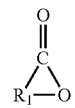

[Formula 2]

TABLE 2

| | Example | | | | Comparative Example | | | |
|---|---|---|---|---|---|---|---|---|
| | 1 | 2 | 3 | 4 | 1 | 2 | 3 | 4 |
| Melting temperature (° C.) | 290 | 298 | 306 | 312 | 325 | 321 | 314 | 300 |
| Crystallization temperature (° C.) | 257 | 260 | 264 | 272 | 295 | 288 | 278 | 265 |
| Glass transition temperature (° C.) | 84 | 90 | 93 | 86 | 100 | 96 | 95 | 91 |
| Intrinsic viscosity (dL/g) | 0.84 | 0.79 | 0.91 | 0.89 | 0.85 | 0.90 | 0.78 | 0.95 |
| MI (g/10 min) | 42.1 | 39.4 | 40.7 | 41.9 | 29.1 | 28 | 24 | 18 |
| Moisture absorption rate (%) | 0.98 | 0.88 | 0.93 | 0.83 | 0.95 | 1.03 | 1.12 | 0.99 |
| Gas generation amount (wt %) | 5.1 | 4.3 | 3.5 | 3.1 | 4.4 | 4.9 | 5.0 | 5.5 |
| Initial lightness (L*) | 84.3 | 83.3 | 83.7 | 85.7 | 75.6 | 78.2 | 76.5 | 78.5 |
| Lightness after scorch (L*) | 81.9 | 81.0 | 81.5 | 83.4 | 72.1 | 74.8 | 73.6 | 74.7 |
| Color change (ΔE) | 4.9 | 5.5 | 5.2 | 4.3 | 8.3 | 7.5 | 8.1 | 7.3 |
| Yellow index change (ΔYI) | 8.7 | 7.9 | 8.1 | 6.8 | 12.7 | 11.3 | 10.7 | 10.8 |

From the results in Table 2, it can be seen that the polyamide ester resins according to the present invention (Examples 1 to 4) are highly heat resistant crystalline polyamide ester resins having a melting temperature of 280° C. or more and a crystallization temperature of 250° C. to 290° C. and exhibit excellent properties in terms of fluidity, discoloration resistance, moisture absorption resistance, heat resistance and the like.

In contrast, it can be seen that, although the polyamide ester resins of the Comparative Examples, which do not -continued

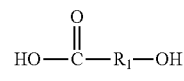

[Formula 3]

wherein $R_1$ in Formula 2 and 3 is the same as defined in Formula 1.

3. The polyamide ester resin according to claim 1, wherein the dicarboxylic acid comprises about 50 mol % to about 100 mol % of a $C_8$ to $C_{20}$ aromatic dicarboxylic acid and optionally about 50 mol % or less of a $C_6$ to $C_{20}$ aliphatic dicarboxylic acid.

4. The polyamide ester resin according to claim 1, wherein the diamine comprises at least one $C_4$ to $C_{20}$ aliphatic diamine.

5. The polyamide ester resin according to claim 1, wherein the repeat unit represented by Formula 1 is present in an amount of about 1 part by mole to about 30 parts by mole based on about 100 parts by mole of the repeat unit derived from the dicarboxylic acid and the repeat unit derived from the diamine, and a molar ratio of the repeat unit derived from the dicarboxylic acid to the repeat unit derived from the diamine (dicarboxylic acid/diamine) ranges from about 0.95 to about 1.15.

6. The polyamide ester resin according to claim 1, wherein the polyamide ester resin has a crystallization temperature (Tc) of about 250° C. to about 290° C., a glass transition temperature (Tg) of about 80° C. to about 120° C., an intrinsic viscosity of about 0.5 dL/g to about 2.0 dL/g, and a water absorption rate of about 1.5% or less as measured on a specimen having a size of about 100 mm×about 100 mm×about 3 mm after treatment of the specimen at about 50° C. and about 90% RH for about 48 hours.

7. The polyamide ester resin according to claim 1, wherein the polyamide ester resin has a color change (ΔE) of about 4 to about 7, as represented by Equation 1:

Color change $(\Delta E) = \sqrt{(\Delta L^*)^2 + (\Delta a^*)^2 + (\Delta b^*)^2}$   [Equation 1]

wherein ΔL* is a difference of L* before and after a scorch test, Δa* is a difference of a* before and after the scorch test, and Δb* is a difference of b* before and after the scorch test.

8. A method for preparing a polyamide ester resin, comprising:
polymerizing a monomer mixture comprising a dicarboxylic acid, a diamine, and a cyclic ester compound represented by the following Formula 2 and/or a hydroxycarboxylic acid compound represented by the following Formula 3,
wherein the polyamide ester resin has a melting temperature (Tm) of about 280° C. or more:

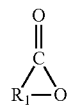
[Formula 2]

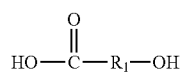
[Formula 3]

wherein $R_1$ in Formula 2 and 3 is a $C_3$ to $C_{12}$ linear, branched or cyclic alkylene group.

9. The method according to claim 8, comprising:
preparing a prepolymer by polymerization of the monomer mixture; and
performing solid-state polymerization of the prepolymer.

10. The method according to claim 9, wherein the solid-state polymerization is performed by heating the prepolymer to a temperature of about 150° C. to about 280° C.

11. A molded article formed from the polyamide ester resin according to claim 1.

* * * * *